United States Patent [19]

Buma et al.

[11] Patent Number: 4,911,617
[45] Date of Patent: Mar. 27, 1990

[54] AIR PRESSURE CIRCUIT

[75] Inventors: Shuuichi Buma; Nobutaka Ohwa, both of Toyota; Osamu Takeda, Susono; Hajime Kamimae, Toyota, all of Japan

[73] Assignee: Toyota Jidosha Kabushiki Kaisha, Japan

[21] Appl. No.: 348,084

[22] Filed: May 4, 1989

Related U.S. Application Data

[63] Continuation of Ser. No. 174,342, Mar. 28, 1988, abandoned.

[30] Foreign Application Priority Data

Mar. 30, 1987 [JP] Japan .............................. 62-47457[U]

[51] Int. Cl.⁴ .............................................. F16F 9/04
[52] U.S. Cl. .................................... 417/439; 280/711; 417/542
[58] Field of Search ............... 417/559, 371, 540, 542, 417/439, 255, 349, 377, 374, 370; 280/711

[56] References Cited

U.S. PATENT DOCUMENTS

| | | | |
|---|---|---|---|
| 1,648,908 | 11/1927 | Mercier | 267/64.16 |
| 2,912,254 | 11/1959 | Harry | 280/124 |
| 3,188,103 | 6/1965 | von Lowis | 280/6.1 |
| 3,338,509 | 8/1967 | McAninch | 417/242 |
| 3,640,082 | 2/1972 | Dehne | 417/439 |
| 3,874,692 | 4/1975 | Ono | 280/711 |
| 4,396,363 | 8/1983 | Sakamaki et al. | 417/439 |
| 4,465,297 | 8/1984 | Yamahara | 280/711 |

FOREIGN PATENT DOCUMENTS

| | | |
|---|---|---|
| 544838 | 9/1922 | France . |
| 645538 | 10/1928 | France . |
| 1399788 | 9/1965 | France . |
| 1562307 | 4/1969 | France . |
| 50-28589 | 9/1975 | Japan .................................. 280/711 |
| 1194221 | 6/1970 | United Kingdom . |

*Primary Examiner*—Leonard E. Smith
*Assistant Examiner*—Robert N. Blackmon
*Attorney, Agent, or Firm*—Oliff & Berridge

[57] ABSTRACT

An air pressure circuit comprising a compressor cylinder which is divided into two chambers by a slidable piston, a suction port and an exhaust port each, having a valve and mounted on one chamber of the cylinder, inhaling air of a pressure higher than that of atmospheric air form the suction port and exhausting the piston-compressed air from the exhaust port. The air pressure in the side of suction port is introduced from the other chamber of the cylinder.

4 Claims, 2 Drawing Sheets

AIR PRESSURE CIRCUIT

This is a continuation of application Ser. No. 174,342 filed Mar. 28, 1988, abandoned.

FIELD OF THE INVENTION

The present invention relates to energy economizing at starting time and during operation of an air pressure circuit including a compressor, such a circuit as is used, for example in the air suspension of a vehicle.

BACKGROUND OF THE INVENTION

An air suspension utilizing air pressure is often used, particularly in vehicles, to realize high grade control in concatenation with electronic control devices because the suspension characteristic may be easily changed.

An example of the constitution and operation of a circuit for adjusting body height by air suspension is disclosed in the examined published Japanese patent No. 28589/1975. This circuit also provides high pressure and low pressure tanks in addition to a compressor as an air pressure source, supplies air to the air chamber of each air suspension of each wheel from a high pressure tank and returns the air exhausted from the air suspension to the low pressure tank. Since the compressor compresses the air in the low pressure tank to supply the air to the high pressure tank, operating energy usage of the system as a whole can be reduced.

However, such energy reduction effect of compressor is not yet sufficient in a reciprocal piston type compressor. Namely, a compressor of this type is provided with a suction port and an exhaust port, each having a valve to the one cylinder piston chamber; and load and energy loss result during compression because the other cylinder chamber is generally in communication with atmospheric air, resulting in a large pressure difference between the two sides of the piston.

SUMMARY OF THE INVENTION

An object of the present invention is to provide an air pressure circuit including a compressor which decreases a load acting on the compressor at its start time and during its operation.

Another object of the present invention is to provide an air pressure circuit including a compressor which enables the use of a small size compressor.

Another object of the present invention is to provide an air pressure circuit including a compressor which has excellent circuit efficiency.

In general, the foregoing and other objects will be attained by an air pressure circuit which comprises a compressor including a cylinder having a through hole therein, said through hole being divided into two chambers by a piston slidably housed therein, a suction port having a suction valve and an exhaust port having an exhaust valve, whereby air is sucked into one of said chambers via said suction port, compressed therein and exhausted from said exhaust port; an actuator which is operated by compressed air discharged from said compressor; an air supply source which supplies air to said suction port of said compressor, said air having a pressure higher than that of atmospheric air; and an air passage which communicates said air supply source with said one of said chambers of said compressor.

DETAILED DESCRIPTION OF THE INVENTION

Figure 1:
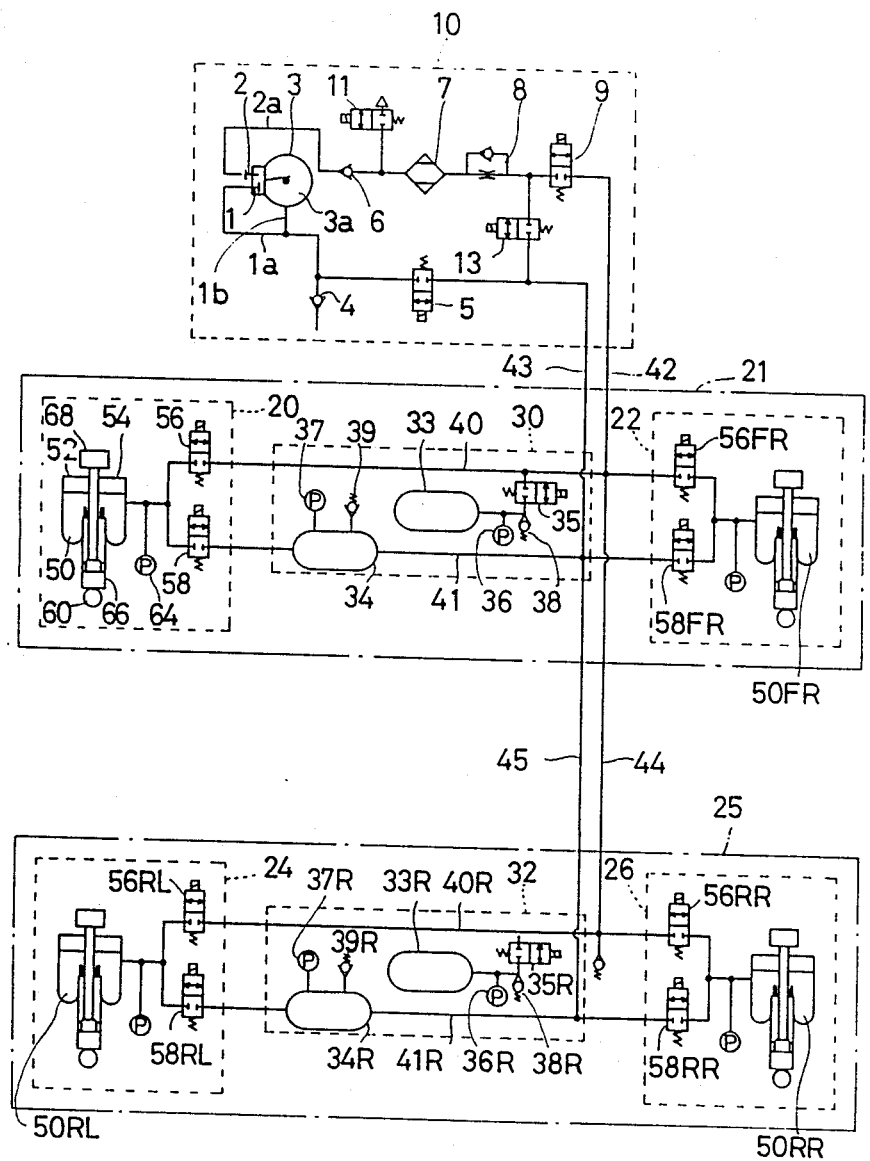
FIG. 1 is a circuit diagram of an air suspension system of a vehicle as a preferred embodiment of the present invention and FIG. 2 is a partial sectional view indicating a structure of a pump used in the system.

An example in which the present invention is adopted for an air suspension system of an automobile is explained hereunder. In FIG. 1 the system of the present invention roughly comprises a compressed air supply and exhaust system 10, suspension systems for each suspension 20, 22, 24, 26 and reservoir systems 30, 32 including high and low pressure reservoir tanks. Four suspension systems can be classified into the front wheels system 21 including the left and right front wheel systems 20, 22 and the rear wheels system 25 including the left and right rear wheel systems 24, 26, and the reservoir systems 30, 32 are provided to respective systems 21, 25.

The left and right front wheel suspension systems 20, 22 are connected by a supply pipe 40 and an exhaust pipe 41. The left and right rear wheel suspension systems 24, 26 are also connected by a supply pipe 40R and an exhaust pipe 41R.

Between the compressed air supply and exhaust system 10 and the air supply pipe 40 and air exhaust pipe 41 of the front wheel system 21, a supply and an exhaust pipe 42, 43 are connected. Moreover, a supply and an exhaust pipe 44, 45 are also connected between the front wheel system 21 and the rear wheel system 25.

The compressed air supply exhaust system 10 is also provided with a compressor 3 having a suction port 1 and an exhaust port 2. The suction port 1 of the compressor 3 is opened to the atmospheric air through a non-return valve by a pipe 1a, which is connected with the exhaust pipe 43 through a flow control return valve 5. The pipe 1a is further connected to a piston lower chamber 3a below a piston 253 of the compressor 3 by a pipe 1b.

The exhaust port 2 of the compressor 3 is opened, by a pipe 2a, to the supply pipe 42 through a non-return valve 6, an air dryer 7, a oneway throttle valve 8 and a flow control main valve 9. An exhaust valve 11 opened to atmospheric air is provided between the non-return valve 6 and air dryer 7 in the supply side. In the same way, a section between the oneway throttle valve 8 and flow control main valve 9 in the supply side is connected to the exhaust pipe 43 through a flow control bypass valve 13.

Figure 2:
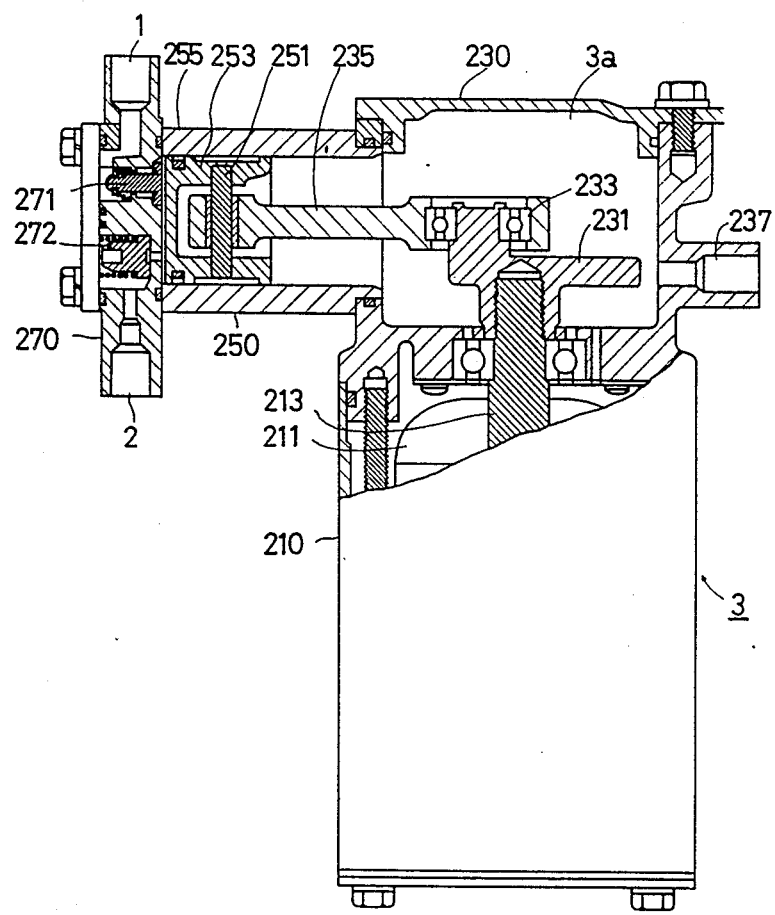

The structure of the compressor 3 is explained in further detail with reference to FIG. 2. The compressor 3 can roughly be classified into a motor section 210, a crank cylindrical section 230, a cylinder section 250 and a cylinder head section 270. The motor section 210 is provided with a motor 211 which is electrically driven and a shaft 213 thereof extends into the crank section 230. In the crank section 230, a crank 231 is fixed to the motor shaft 213 and the crank 231 is provided with a connecting rod 235 through a bearing 233. The connecting rod 235 extends toward the cylinder section 250 at a right angle from the motor shaft 213 and is connected to a piston 253 by a piston pin 251. The piston 253 slides in the right to left direction within a cylinder 255 as indicated in FIG. 2. In FIG. 2, the space in the right side of piston 253 in which the crank 231 rotates is the piston lower chamber 3a explained above.

The crank section 230 is provided with the piston lower chamber 3a and a B port 237 opened to the outside of the compressor through the pipe 1b connected thereto as explained above.

The cylinder head section 270 is fixed within the opposite side of crank of cylinder 255, closing the cylinder 255. The cylinder head section 270 is provided with the suction port (A port) 1 and exhaust port (C port) 2, and a suction valve 271 and an exhaust valve 272 are respectively provided between such ports and cylinder 255. These valves are usually held in the closed position by compression springs, but the suction valve 271 is movable to one side of cylinder 255 while the exhaust valve 272 is movable to the opposite side thereto. The compression spring of exhaust valve 272 is adjusted to a predetermined intensity. The suction port 1 is connected with the pipe 1a, while the exhaust port 2 with the pipe 2a.

Returning to FIG. 1, other air pressure circuit sections are explained. Since the reservoir systems 30, 32 have the same structure, explanation is made to the reservoir system 30 of the front wheels system 21. The reservoir system 30 is provided with a high pressure reservoir tank 33 and a low pressure reservoir tank 34. The high pressure reservoir tank 33 is connected to the supply pipe 40 connecting the left and right front wheel suspension systems 20, 22 through a front reservoir high pressure valve 35. The low pressure reservoir tank 34 is inserted directly within an intermediate section of the exhaust pipe 41 connecting the left and right suspension systems 20, 22. Tanks 33, 34 are provided with respective pressure sensors 36, 37 and relief valves 38, 39. For convenience of explanation, corresponding elements of reservoir system 32 and the pipe of rear wheel system 25 are indicated by the element number in the front wheel system followed by an "R".

Since the structure and function of the suspension systems of respective wheels are the same, explanation will be made of the suspension system 20 of left front wheel. The suspension system 20 comprises an air suspension body 54 having an air chamber 50, a leveling valve 56 provided to the supply pipe 40 and a discharge valve 58 provided to the exhaust pipe 41. The supply pipe 40 and exhaust pipe 41 are joined immediately before the air chamber 50 of air suspension body 54 and a pressure sensor 64 is provided thereto. Since the air suspension body 54 is also provided with a shock absorber 66 which, in addition to the air chamber 50, is capable of varying a damping force, it is also provided with an actuator 68 for changing the damping force. The air suspension body 54 is fixed to a vehicle body (not illustrated) at an upper part 52 of the air chamber 50 and is also fixed to a suspension arm (not illustrated) at a lower part 60 of shock absorber 66. For the convenience of the successive explanation, the letters FR, RL, RR are given after the respective element numbers in each system of the right front wheel 22, left rear wheel 24 and right rear wheel 26.

The above explanation has been made to the air pressure circuits; electrical circuits are also explained hereunder. Each pressure sensor explained above is connected to an electronic control device (not illustrated), and pressure signals of each tank and air chamber are input to the electronic control device. Each wheel is provided with a body height sensor (not illustrated) and the body height values of respective wheels are also input to the electronic control device. Moreover, the solenoid valves explained previously are formed by a 2-position electromagnetic valve. This valve is usually set in the OFF position as indicated in FIG. 1 and is set in the ON position when a drive current is sent from the electronic control device. The compressor 3 is connected with a driver circuit and this driver circuit is further connected with the electronic control device.

The electronic control device carries out calculations in compliance with a preloaded program for body height adjustment and vehicle attitude control on the basis of the input signals received from respective pressure sensors, body height sensors and other sensors in order to determine the amount of air to be supplied to the air chamber of the respective air suspension body, and the amount of air to be exhausted from the air chamber. On the basis of this value calculated as explained above, the electronic control device supplies a drive current to the relevant 2-position electromagnetic valve to execute a specified body height adjustments, and vehicle attitude control. In the case of vehicle attitude control, a damper force of shock absorber 66 is also varied. Moreover, responding to a pressure signal received from the pressure sensors 36, 36R of high pressure reservoir tanks 33, 33R, the electronic control device issues a command signal to the driver circuit of compressor 3 when it's required to rotate the motor 211.

Operations of the system of the present invention during the body height adjustment will be explained hereunder. Depending on the signals sent from the body height sensors provided to respective wheels, when it is detected that the body height has been decreased by a certain value, the electronic control device starts executing a predetermined routine which carries out the control for returning the body height to the initial condition, as explained below.

First, an amount of air to be supplied to the air chamber of each air suspension body in order to compensate for the detected reduction of body height is calculated. Based on such amount of air to be supplied, the time for opening respective valves, for example, the front reservoir high pressure valve 35, left front leveling valve 56 and right front leveling valve 56FR of the front wheels system 21 is calculated, and an excitation current is applied to the solenoid of each valve only during such interval. The process is the same for the rear wheels system 25. Thereby, the high pressure air is supplied to the air chamber of air suspension of each wheel from the high pressure reservoir tanks 33, 33R in order to compensate for reduction of body height. After the predetermined time, the valves are closed and body height adjustment is terminated.

Although the compensatory operations for lowering the body height as explained above are similar to those for raising it, the air exhausted from the air chambers 50, 50FR, 50RL, 50RR of respective air suspension bodies accumulates in the low pressure reservoir tanks 34, 34R. Pressure in the low pressure reservoir tanks 34, 34R is kept at a predetermined value exceeding atmospheric pressure. However, this pressure is naturally lower than the mean pressure in the air chamber of each air suspension body (internal pressure of air suspension body in static condition).

After the body height is increased, since the air pressure in the high pressure reservoir tanks 33, 33R has been somewhat reduced, air is added to the high pressure reservoir tanks 33, 33R from the compressed air supply exhaust system 10. In this case, the leveling valve 56 and discharge valve 58 in each air suspension system are set in the OFF position and the front reservoir high pressure valve 35 and rear reservoir high pressure valve 35R are set in the ON position. The flow control return valve 5 is also set in the ON position.

When an operation current is supplied from the driver circuit responding to the command from the electronic control device, the motor 211 of compressor 3 rotates and the piston 253 moves back and forth in the cylinder 255.

When the piston 253 moves toward the crank section 230 (suction stroke), the suction valve 271 is released against the force of spring and air is sucked into the cylinder 255 via the pipe 1a. In this case, since the flow control return valve 5 is set to the ON position, the low pressure air in the low pressure reservoir tanks 34, 34R is guided to the pipe 1a. As explained earlier, since the air pressure in the low pressure reservoir tanks 34, 34R is higher than the atmospheric pressure, the non-return valve 4 is closed and the atmospheric air is not guided into the cylinder 255. Accordingly, since the pipe 1a is also opened to the lower chamber 3a by the pipe 1b, there is no pressure difference in both sides of piston 253 and the load applied on the motor 211 in suction stroke is the same with that in the case of sucking atmospheric pressure into the cylinder chamber of piston side.

When the piston 253 moves toward the cylinder head section 270 (exhaust stroke), the exhaust valve 272 is released against the spring force and the air sucked into the cylinder 255 is exhausted into the pipe 2a. In this case, the suction valve 271 is closed by the air pressure in the cylinder 255. Moreover, pressure of the air exhausted is increased up to the determined high pressure by the spring force intensity on exhaust valve 272. In this case, since low pressure air is also being supplied into the lower chamber 3a by the pipe 1b, a pressure difference between both sides of piston 253 becomes equal to a value (high pressure minus low pressure), whereby the load applied on the motor 211 is reduced as compared to the case in which the lower chamber 3a is opened to the ambient atmospheric air.

As explained earlier, since the lower chamber 3a of the compressor 3 introduces the air pressure into the side of suction port, the particular load acting on the compressor motor 211 becomes small during the exhaust stroke. Therefore, the energy used for starting and operating compressor 3 is reduced and a smaller version of a motor 211 may be used.

The pressurized air supplied by the compressor 3 passes through the non-return valve 6 and dryer 7 which eliminates the contained moisture, then passes without resistance through oneway throttle valve 8, and is then supplied to the supply pipe 42 through the flow control main valve 9 set in the ON position. Since the supply pipe 42 is connected to the supply pipe 40 of the front wheels system 21 and the front and rear supply pipe 44 which connects the supply pipe 40 of the front wheels system 21 to the supply pipe 40R of the rear wheels system 25, the high pressure air supplied from the compressed air supply exhaust system 10 through the front reservoir high presure valve 35 and rear reservoir high pressure valve 35R is received and held for a while in both high pressure reservoir tanks 33. The air supplied to the compressor 3 may also be atmospheric air, instead of the air from the low pressure reservoir tanks 34, 34R, as selected by setting the flow control return valve 5 to the OFF position.

Thus it should be understood that although a certain embodiment of the invention has been shown and described for the purpose of illustration, it will of course be apparent that the invention is not limited to the embodiment illustrated and described, but in its broadest aspects it includes all equivalent embodiments and modifications which come within the scope of the invention.

What is claimed is:

1. An air pressure circuit comprising:
   a compressor including a cylinder having a through hole therein, said through hole being divided into first and second chambers by a piston slidably housed therein, a suction port having a suction valve and an exhaust port having an exhaust valve, whereby air is sucked into said first chamber via said suction port, compressed therein and exhausted from said exhaust port;
   an actuator which is operated by compressed air discharged from said compressor;
   an air supply source which supplies air to said suction port of said compressor, said air having a pressure higher than that of atmospheric air;
   a first air passage that communicates the air supply source with said first chamber of the compressor;
   a second air passage which communicates said first air passage with said second chamber of said compressor further comprising a check valve on said first air passage in an upstream position from a communicating position of said first and second air passages, whereby said check valve opens when the pressure of said air supply source is less than atmospheric pressure, thereby introducing atmospheric air into said suction port of said compressor.

2. An air pressure circuit as claimed in claim 1, wherein said air pressure circuit includes a reservoir tank which reserves therein the compressed air discharged from said compressor.

3. An air pressure circuit as claimed in claim 1, wherein said air supply source is a reservoir tank which reserves therein the air discharged from said actuator.

4. An air pressure circuit comprising:
   a compressor including a cylinder having a through hole therein, the through hole being divided into first and second chambers by a piston slidably housed therein, a suction port having a suction valve and an exhaust port having an exhaust valve, whereby air is sucked into said first chamber via said suction port compressed therein, and exhausted from said exhaust port;
   an actuator which is operated by compressed air discharged from said compressor;
   an air supply source that supplies air to the suction port of said compressor, said air having a pressure higher than that of atmospheric air;
   a first air passage which communicates said air supply source with said first chamber of the compressor; and
   a second air passage that permits bi-directional air flow between the first air passage and said second chamber of the compressor.

* * * * *